United States Patent
Malik et al.

(10) Patent No.: US 8,341,018 B2
(45) Date of Patent: *Dec. 25, 2012

(54) METHODS AND SYSTEMS FOR PROVIDING CONTEXTUAL INFORMATION ON COMMUNICATION DEVICES AND SERVICES

(75) Inventors: Dale W. Malik, Dunwoody, GA (US); Richard A. Anderson, Alpharetta, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 1465 days.

This patent is subject to a terminal disclaimer.

(21) Appl. No.: 10/184,588

(22) Filed: Jun. 28, 2002

(65) Prior Publication Data

US 2003/0065768 A1   Apr. 3, 2003

Related U.S. Application Data

(63) Continuation-in-part of application No. 09/966,703, filed on Sep. 28, 2001, now Pat. No. 7,313,617.

(51) Int. Cl.
*G06Q 30/00* (2012.01)

(52) U.S. Cl. ............ 705/14.49; 709/203; 709/204; 709/219

(58) Field of Classification Search ............ 709/224, 709/203, 204, 232, 219; 705/14.49
See application file for complete search history.

(56) References Cited

U.S. PATENT DOCUMENTS

| | | | |
|---|---|---|---|
| 4,266,098 A | 5/1981 | Novak | |
| 4,706,242 A | 11/1987 | Harland | |
| 4,850,007 A * | 7/1989 | Marino et al. | 379/114.13 |
| 4,935,954 A | 6/1990 | Thompson et al. | |
| 4,969,136 A | 11/1990 | Chamberlin | |
| 4,975,896 A | 12/1990 | D'Agosto | |
| 5,311,583 A | 5/1994 | Friedes et al. | |
| 5,436,965 A | 7/1995 | Grossman et al. | |
| 5,570,417 A | 10/1996 | Byers | |
| 5,592,470 A | 1/1997 | Rudrapatna et al. | |
| 5,608,786 A | 3/1997 | Gordon | |

(Continued)

FOREIGN PATENT DOCUMENTS

JP   2000105739   4/2000

(Continued)

OTHER PUBLICATIONS

Microsoft Office, Microsoft Outlook 2000, Product Enhancements Guide, published 1998, pp. 1, 48-52.*

(Continued)

*Primary Examiner* — Kamal Divecha
(74) *Attorney, Agent, or Firm* — Scott P. Zimmerman, PLLC

(57) ABSTRACT

Methods and systems for providing contextual information regarding communication devices and/or services. Profile information relating to a user is stored by a communications manager. Data about a communication for the user may be received from a telecommunications manager in a telecommunications network or from a gateway in a data network. A comparison is made between the profile information and the data about the communication. Based on the comparison, contextual information relating to the communication is presented. The contextual information may be presented while the user participates in the communication. The contextual information may relate to a communication device and/or service used in the communication. The contextual information may relate to a discrepancy between the profile information relating to the user and the originating communication device and/or service. Further, the contextual information may be obtained from a telecom manager in a telecommunications network or from a gateway in a data network.

10 Claims, 5 Drawing Sheets

U.S. PATENT DOCUMENTS

| | | | |
|---|---|---|---|
| 5,621,790 A | 4/1997 | Grossman et al. | |
| 5,644,624 A | 7/1997 | Caldwell | |
| 5,661,783 A | 8/1997 | Assis | |
| 5,708,775 A | 1/1998 | Nakamura | |
| 5,802,510 A | 9/1998 | Jones | |
| 5,812,654 A | 9/1998 | Anderson | |
| 5,818,447 A | 10/1998 | Wolf | |
| 5,822,410 A | 10/1998 | McCausland et al. | |
| 5,889,799 A | 3/1999 | Grossman et al. | |
| 5,909,589 A | 6/1999 | Parker | |
| 5,937,047 A * | 8/1999 | Stabler | 379/67.1 |
| 5,943,417 A | 8/1999 | Cox et al. | |
| 5,946,386 A | 8/1999 | Rogers | |
| 5,966,437 A | 10/1999 | Cox et al. | |
| 5,974,388 A | 10/1999 | Durham | |
| 5,978,475 A | 11/1999 | Schneier et al. | |
| 5,987,100 A | 11/1999 | Fortman et al. | |
| 6,014,135 A | 1/2000 | Fernandes | |
| 6,023,700 A | 2/2000 | Owens et al. | |
| 6,052,730 A | 4/2000 | Felciano | |
| 6,055,512 A * | 4/2000 | Dean et al. | 705/17 |
| 6,065,047 A | 5/2000 | Carpenter | |
| 6,075,850 A * | 6/2000 | Ali et al. | 379/142.01 |
| 6,088,588 A | 7/2000 | Osborne | |
| 6,091,802 A | 7/2000 | Smith | |
| 6,118,856 A | 9/2000 | Paarsmarkt et al. | |
| 6,125,108 A * | 9/2000 | Shaffer et al. | 370/259 |
| 6,128,624 A | 10/2000 | Papierniak et al. | |
| 6,133,853 A | 10/2000 | Obradovich et al. | |
| 6,134,235 A | 10/2000 | Goldman et al. | |
| 6,147,975 A | 11/2000 | Bowman-Amuah | |
| 6,148,261 A | 11/2000 | Obradovich et al. | |
| 6,148,329 A | 11/2000 | Meyer | |
| 6,151,584 A | 11/2000 | Papierniak et al. | |
| 6,154,530 A | 11/2000 | Letellier | |
| 6,167,119 A | 12/2000 | Bartholomew | |
| 6,182,142 B1 | 1/2001 | Win et al. | |
| 6,205,211 B1 | 3/2001 | Thomas et al. | |
| 6,208,721 B1 | 3/2001 | Feinberg et al. | |
| 6,216,104 B1 | 4/2001 | Moshfeghi et al. | |
| 6,233,317 B1 | 5/2001 | Homan et al. | |
| 6,236,768 B1 | 5/2001 | Rhodes | |
| 6,237,027 B1 | 5/2001 | Namekawa | |
| 6,247,043 B1 | 6/2001 | Bates et al. | |
| 6,252,672 B1 * | 6/2001 | Sugawara et al. | 358/1.15 |
| 6,266,690 B1 | 7/2001 | Shankarappa et al. | |
| 6,272,150 B1 | 8/2001 | Hrastar et al. | |
| 6,272,537 B1 | 8/2001 | Kekic | |
| 6,282,275 B1 | 8/2001 | Gurbani | |
| 6,301,245 B1 | 10/2001 | Luzeski et al. | |
| 6,304,635 B1 | 10/2001 | Iwami | |
| 6,308,328 B1 | 10/2001 | Bowcutt et al. | |
| 6,317,485 B1 | 11/2001 | Homan et al. | |
| 6,320,947 B1 | 11/2001 | Joyce | |
| 6,330,079 B1 | 12/2001 | Dugan | |
| 6,338,066 B1 | 1/2002 | Martin | |
| 6,345,239 B1 | 2/2002 | Bowman-Amuah | |
| 6,351,771 B1 | 2/2002 | Craddock et al. | |
| 8,351,771 | 2/2002 | Craddock et at | |
| 6,353,659 B1 * | 3/2002 | Van Ryzin et al. | 379/88.12 |
| 6,353,852 B1 | 3/2002 | Nestoriak et al. | |
| 6,360,254 B1 | 3/2002 | Linden | |
| 6,385,311 B1 | 5/2002 | Bauer et al. | |
| 6,400,810 B1 | 6/2002 | Skladman et al. | |
| 6,404,762 B1 | 6/2002 | Luzeski et al. | |
| 6,411,685 B1 | 6/2002 | O'Neal | |
| 6,421,725 B1 | 7/2002 | Vermilyea et al. | |
| 6,424,966 B1 | 7/2002 | Meyerzon | |
| 6,424,995 B1 | 7/2002 | Shuman | |
| 6,430,177 B1 | 8/2002 | Luzeski et al. | |
| 6,430,188 B1 | 8/2002 | Kadambi et al. | |
| 6,434,747 B1 | 8/2002 | Khoo et al. | |
| 6,453,353 B1 | 9/2002 | Win et al. | |
| 6,459,782 B1 * | 10/2002 | Bedrosian et al. | 379/201.08 |
| 6,478,056 B1 | 11/2002 | Capiotti | |
| 6,493,437 B1 * | 12/2002 | Olshansky | 379/114.13 |
| 6,496,838 B1 | 12/2002 | Zamora-McKelvy | |
| 6,515,968 B1 * | 2/2003 | Combar et al. | 370/252 |
| 6,518,968 B1 | 2/2003 | Combar et al. | |
| 6,518,984 B1 | 2/2003 | Maeckel et al. | |
| 6,526,044 B1 | 2/2003 | Cookmeyer | |
| 6,529,954 B1 | 3/2003 | Cookmeyer | |
| 6,535,585 B1 | 3/2003 | Hanson et al. | |
| 6,556,666 B1 | 4/2003 | Beyda et al. | 379/88.12 |
| 6,560,633 B1 | 5/2003 | Roberts | |
| 6,564,261 B1 | 5/2003 | Gudjonsson et al. | |
| 6,570,855 B1 | 5/2003 | Kung et al. | |
| 6,574,678 B1 | 6/2003 | Nykanen et al. | |
| 6,594,255 B1 | 7/2003 | Neuman | 370/352 |
| 6,611,501 B1 | 8/2003 | Owen et al. | |
| 6,615,241 B1 | 9/2003 | Miller et al. | |
| 6,625,258 B1 * | 9/2003 | Ram et al. | 379/88.13 |
| 6,631,186 B1 | 10/2003 | Adams et al. | |
| 6,631,402 B1 | 10/2003 | Devine | |
| 6,633,630 B1 | 10/2003 | Owens et al. | 379/93.24 |
| 6,640,230 B1 * | 10/2003 | Alexander et al. | 707/10 |
| 6,640,241 B1 | 10/2003 | Ozzie et al. | |
| 6,665,378 B1 | 12/2003 | Spielman et al. | 378/88.12 |
| 6,699,007 B2 * | 3/2004 | Huang et al. | 414/801 |
| 6,701,348 B2 | 3/2004 | Sommerer | |
| 6,708,202 B1 | 3/2004 | Shuman et al. | |
| 6,711,154 B1 | 3/2004 | O'Neal | |
| 6,717,513 B1 | 4/2004 | Shprecher et al. | 340/506 |
| 6,731,927 B1 | 5/2004 | Stern et al. | |
| 6,735,286 B1 | 5/2004 | Hansen | |
| 6,738,462 B1 | 5/2004 | Brunson | |
| 6,741,697 B2 | 5/2004 | Benson | |
| 6,745,229 B1 | 6/2004 | Goblin et al. | |
| 6,747,970 B1 | 6/2004 | Lamb et al. | 370/352 |
| 6,748,056 B1 | 6/2004 | Capriotti et al. | |
| 6,754,181 B1 | 6/2004 | Elliott et al. | 370/252 |
| 6,757,732 B1 | 6/2004 | Sollee | |
| 6,760,601 B1 * | 7/2004 | Suoknuuti et al. | 455/557 |
| 6,763,102 B1 * | 7/2004 | Chen et al. | 379/221.15 |
| 6,766,369 B1 | 7/2004 | Haitsuka et al. | |
| 6,768,722 B1 | 7/2004 | Katseff et al. | |
| 6,772,188 B1 | 8/2004 | Cloutier | |
| 6,782,086 B2 | 8/2004 | Clapper | |
| 6,785,266 B2 * | 8/2004 | Swartz | 370/352 |
| 6,785,379 B1 | 8/2004 | Rogers | |
| 6,788,926 B1 | 9/2004 | Frangione et al. | |
| 6,804,707 B1 | 10/2004 | Ronning | |
| 6,804,716 B1 | 10/2004 | Koch et al. | |
| 6,806,977 B1 | 10/2004 | Freeny et al. | 358/1.15 |
| 6,807,423 B1 | 10/2004 | Armstrong et al. | 455/440 |
| 6,807,574 B1 * | 10/2004 | Partovi et al. | 709/224 |
| 6,816,469 B1 | 11/2004 | Kung et al. | |
| 6,820,204 B1 | 11/2004 | Desai et al. | 713/201 |
| 6,826,639 B2 | 11/2004 | Pasumansky | |
| 6,829,233 B1 * | 12/2004 | Gilboy | 370/352 |
| 6,839,414 B1 * | 1/2005 | Enzmann et al. | 379/142.06 |
| 6,842,767 B1 | 1/2005 | Partovi et al. | |
| 6,857,024 B1 * | 2/2005 | Chen et al. | 709/231 |
| 6,879,995 B1 | 4/2005 | Chinta et al. | |
| 6,882,709 B1 | 4/2005 | Sherlock | |
| 6,892,083 B2 | 5/2005 | Shostak | |
| 6,895,559 B2 | 5/2005 | Forder | |
| 6,904,137 B2 | 6/2005 | Brandt et al. | |
| 6,910,186 B2 | 6/2005 | Kim | |
| 6,917,610 B1 | 7/2005 | Kung et al. | |
| 6,920,208 B1 | 7/2005 | Rosen | |
| 6,920,213 B2 * | 7/2005 | Pershan | 379/212.01 |
| 6,928,154 B1 | 8/2005 | Cheaito | |
| 6,940,958 B2 | 9/2005 | Clapper | |
| 6,947,979 B1 | 9/2005 | Pon | |
| 6,948,135 B1 | 9/2005 | Ruthfield | |
| 6,961,751 B1 | 11/2005 | Bates | |
| 6,973,556 B2 | 12/2005 | Milligan | |
| 6,981,023 B1 | 12/2005 | Hamilton et al. | |
| 6,981,223 B2 | 12/2005 | Becker | |
| 6,988,128 B1 | 1/2006 | Alexander et al. | |
| 7,062,535 B1 | 6/2006 | Stark | |
| 7,088,805 B1 | 8/2006 | Moore | |
| 7,096,232 B2 | 8/2006 | Doss | |
| 7,107,275 B2 | 9/2006 | Quinn | |
| 7,117,504 B2 | 10/2006 | Smith | |
| 7,171,448 B1 | 1/2007 | Danielsen | |

| | | | |
|---|---|---|---|
| 7,313,617 B2 * | 12/2007 | Malik et al. | 709/225 |
| 7,325,032 B2 | 1/2008 | Zuberec et al. | |
| 7,441,027 B2 * | 10/2008 | Malik | 709/224 |
| 7,496,189 B2 * | 2/2009 | Clarisse et al. | 379/207.15 |
| 7,929,951 B2 * | 4/2011 | Stevens | 455/414.1 |
| 8,023,622 B2 * | 9/2011 | Timmins et al. | 379/88.13 |
| 2001/0013050 A1 | 8/2001 | Shah | |
| 2001/0013069 A1 | 8/2001 | Shah | |
| 2001/0027478 A1 * | 10/2001 | Meier et al. | 709/206 |
| 2001/0029468 A1 * | 10/2001 | Yamaguchi et al. | 705/14 |
| 2002/0055924 A1 * | 5/2002 | Liming | 707/100 |
| 2002/0069048 A1 | 6/2002 | Sadhwani et al. | |
| 2002/0073142 A1 | 6/2002 | Moran | |
| 2002/0076015 A1 | 6/2002 | Norwitz et al. | |
| 2002/0078151 A1 | 6/2002 | Wickam et al. | |
| 2002/0091829 A1 | 7/2002 | Wood | |
| 2002/0098849 A1 | 7/2002 | Bloebaum et al. | |
| 2002/0099775 A1 | 7/2002 | Gupta et al. | |
| 2002/0099777 A1 | 7/2002 | Gupta et al. | |
| 2002/0111813 A1 | 8/2002 | Capps | |
| 2002/0124057 A1 | 9/2002 | Besprosvan | |
| 2002/0174188 A1 | 11/2002 | Clark et al. | |
| 2002/0180776 A1 | 12/2002 | Fishman | |
| 2002/0184329 A1 | 12/2002 | Chen | |
| 2002/0194274 A1 | 12/2002 | Kroeger | |
| 2003/0009530 A1 | 1/2003 | Philonenko et al. | |
| 2003/0014553 A1 | 1/2003 | Zhao | |
| 2003/0087652 A1 * | 5/2003 | Simon et al. | 455/466 |
| 2003/0156134 A1 | 8/2003 | Kim | |
| 2004/0091091 A1 * | 5/2004 | Maruyama et al. | 379/114.13 |
| 2004/0236619 A1 | 11/2004 | Gundersen | |
| 2005/0038863 A1 | 2/2005 | Onyon | |
| 2005/0120305 A1 | 6/2005 | Engstrom et al. | |
| 2005/0149487 A1 | 7/2005 | Celik | |
| 2005/0204030 A1 * | 9/2005 | Koch et al. | 709/223 |
| 2007/0100967 A1 | 5/2007 | Smith | |

FOREIGN PATENT DOCUMENTS

WO      WO 97/17774    *    5/1997

OTHER PUBLICATIONS

"Microsoft Outlook 2000 SR-1 Readme File," www.microsoft.com/assistance/offhelp/off2000/outlook/outlhlp9/html/olread9.htm, as of Apr. 30, 2002.

"Microsoft Outlook version 2002 (included in Office XP)," Microsoft Outlook Product Guide, pp. 1-11.

"Microsoft Office," Microsoft Outlook 2000 Product Enhancements Guide, Oct. 1998.

Microsoft Outlook 2000 "About" screen capture printout (1 page).

Microsoft Outlook Programming, webpage printout (4 pages) retrieved from www.outlookcode.com Jun. 13, 2006.

Gordon Padwick and Helen Ferddema, "Special Edition Using Microsoft® Outlook® 2000", May 12, 1999, Que.

* cited by examiner

| PROFILE INFORMATION - USER 102 | SERVICES |
|---|---|
| COMMUNICATION DEVICES | BRAND X |
| TELEPHONE | BELLSOUTH |
| LOCAL SERVICE | AT&T |
| LONG DISTANCE SERVICE | MOTOROLA |
| WIRELESS UNIT | CINGULAR |
| SERVICE | DELL |
| COMPUTER | MICROSOFT |
| E-MAIL SERVICE | |

FIG. 2

METHODS AND SYSTEMS FOR PROVIDING CONTEXTUAL INFORMATION ON COMMUNICATION DEVICES AND SERVICES

RELATED APPLICATION

This application is a continuation-in-part of and claims priority to and the benefit of the prior filed co-pending and commonly owned patent application which has been assigned U.S. patent application Ser. No. 09/966,703, entitled "Methods and Systems for a Communications and Information Resource Manager," filed on Sep. 28, 2001, now U.S. Pat. No. 7,313,617 and which is incorporated herein by this reference.

FIELD OF THE INVENTIONS

The inventions relate to the provision of information on communication devices and services.

BACKGROUND

New products and services are brought to the attention of potential users through myriad types of advertising. Recent developments in digital and broadband distribution technologies have enabled targeted contextual advertisement. For example, while viewing a television show, a viewer may request information regarding a star's wardrobe and be provided with retail or other information. The information generally is provided quickly in response to the user's request. By receiving information at a time when the viewer's interest in the particular item is heightened (such as at the time of the request), the viewer is more likely to register the "in-context" marketing information than at other times. Importantly, the viewer is more likely to buy or take other action when information is provided at the time the viewer's interest is heightened. Accordingly, targeted contextual advertisement can be very effective.

Advertising, of course, is the vehicle for bringing new communication devices and services to the attention of potential users. Recent technological advances have made communication devices ubiquitous with different devices satisfying different aspects of the communication needs of a user. For example, a business person may communicate by telephone, a wireless unit, a voicemail system, a pager, an intelligent ("i") pager, a personal digital assistant (PDA), or a facsimile machine. In addition, the business person may communicate electronically using the aforementioned devices and/or a computer through the use of e-mails, instant messages, chat room discussions, and the like.

Generally, communication devices and services are marketed using conventional advertising techniques. For example, a new or improved communication device or service may be advertised on billboards, in newspapers, on flyers, banners, posters, in commercials on the radio and television, and even on hot air balloons and dirigibles ("blimps"). Further, a new or improved communication device or service may be advertised through the use of sponsorships such as product or trademark/service mark placement at entertainment, sports, and other events.

The conventional advertising of communication devices and services may be characterized as a shotgun approach to marketing. A lot of advertising of communication devices and services is conducted so as to reach a broad audience and hopefully turn at least some members of the audience into customers. Conventional advertising may succeed in grabbing the attention of some potential customers, but grabbing the attention of "some" potential customers generally is not enough. Consumers are inundated with so much marketing information that often they become inured to advertising. In other words, consumers may not always "see" or give their attention to conventional advertising. Thus, conventional advertising may miss getting the word out to potential customers.

Further, even if a potential customer pays attention to the conventional advertising of communication devices and services, the advertising may cross the potential customer's attention span at the wrong time or wrong place. A potential customer driving in an automobile who reads a billboard regarding a new communication service may have his or her interest piqued. But the message delivered by the billboard may have been forgotten or superceded by a competitor's message by the time the potential customer is in a position to act.

Accordingly, there is a need for a method or system to deliver information regarding communication devices and services that is directed to the appropriate target audience, that is brought to the attention of the members of the target audience, that is delivered at an appropriate time and place, and that allows a potential customer to act on the information before forgetting the information or having the information superceded by other information.

A solution to the above stated need is targeted contextual advertisement of the communication devices and services. As noted above, targeted contextual advertisement is the provision of information at a time and in a context when the target's interest is heightened. Such advertising is more likely to gain the attention of the target, and as a result, the target is more likely to buy or take action based on the advertised information.

But the implementation of targeted contextual advertising for communication devices and services heretofore has been problematic. How does advertising target potential customers of communication devices and services in a contextual manner? Is a user of a communication device to be sent commercial information to be listened to or to be read from the face plate of the device? Will the delivery of such information be appropriately targeted? Will the delivery of such information be appropriately timed? Will the user pay attention to the information? Will the user act on the information? Or will the information be considered intrusive or annoying by the user or otherwise cause the user to have negative associations with the advertised communication device or service?

In sum, there is a need for a method or system that implements targeted contextual advertisement of communication devices and services. Further, there is a need for a method or system that implements targeted contextual advertisement of communication devices and services so the information is delivered in an appropriate contextual manner.

SUMMARY

Methods and systems are described regarding the presentation to a user of contextual information relating to a communication directed to the user. The contextual information may relate to a communication device and/or a communication service being used in connection with the communication. Advantageously, the contextual information is provided to the user at a time when the user's interest may be heightened as a result of the communication. As a result, the likelihood of the user's recall of the contextual information or of the user's acting on the contextual information is increased.

More specifically, profile information relating to a user is stored by a communications manager. The profile information may include descriptions of the communication devices and/or communication services used by the user. The communications manager may receive data about communications directed to the user. Data about a communication for the user may be received from a telecommunications manager in a telecommunications network or from a gateway in a data network. The data may include information about the communication device originating the communication and/or information about the communication service(s) involved with the communication.

A comparison is made between the profile information about the user and the data about the communication. Based on the comparison, contextual information relating to the communication is presented to the user. The contextual information may be presented to the user before, during, or after the user participates in the communication. The user may save the contextual information for review at a later time.

In particular, the contextual information presented to the user may refer to a communication device and/or communication service used in the communication. For example, the contextual information may inform the user of the type of communication device and/or service being used by the originating party.

The contextual information may relate to a discrepancy between the profile information relating to the user and the originating communication device and/or communication service. The contextual information presented to the user may include information relating to the discrepancy. As an example, the user may not have a wireless unit. The communication for the user may have originated from a wireless unit. Thus, the contextual information presented to the user may include advertising, technical, or other information relating to wireless units.

Once the user is presented with contextual information, the user may be offered additional contextual information. To further the example discussed above, once the user is presented with the contextual information about wireless units in general, the user may request and be presented with more particular information about a specific wireless unit or brand of unit. The more particular information may be presented to the user through a connection to a web site in a data network where the web site has the particular information about the specific wireless unit or brand of unit.

Further, the contextual information and the additional contextual information may be obtained from the communication manager, from a telecom manager in a telecommunications network, or from a gateway in a data network. Advantageously, a service provider or other entity that controls the content of the contextual information may have exclusive marketing access to the user and may be presented with such access at a time when the user's interest is heightened.

In sum, the inventions described herein allow for the targeted contextual advertisement of communication devices and services. Further, the inventions implement the targeted contextual advertisement of communication devices and services so the information is delivered in an appropriate contextual manner.

BRIEF DESCRIPTION OF THE DRAWINGS

FIG. 2 is a block diagram of exemplary profile information relating to a user.

DETAILED DESCRIPTION

Figure 1A:
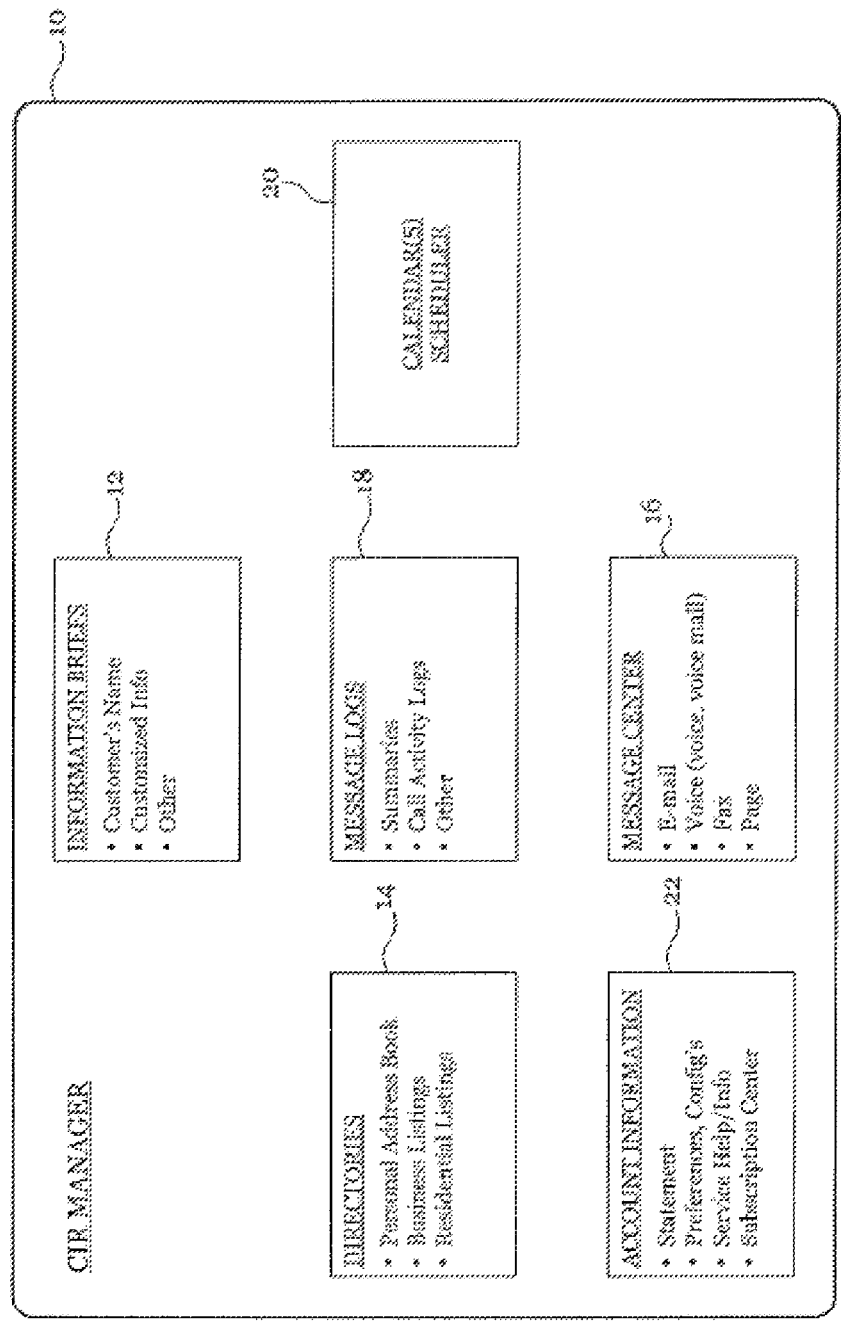
FIG. 1A is a block diagram illustrating exemplary functions of an exemplary CIR manager.

Stated generally, the inventions provide contextual information regarding communication devices or services. For example, a user may receive a call from a friend who is using a wireless unit. The user may not have or use a wireless unit. While the user is engaged in the call with the friend or afterwards, the user may be provided with contextual information relating to the wireless unit used by the friend. The contextual information may contain advertising or other information relating to the wireless unit. Advantageously, the contextual information regarding the wireless unit is provided to the user at a time when the user's interest in the wireless unit may be heightened as a result of the communication from the friend's wireless unit. As a result, the likelihood of the user's purchase of a similar wireless unit is heightened.

In addition to the inventions described herein, additional inventions relating to The presentation of contextual information are described in the commonly owned U.S. patent application Ser. No. 10/154,670, entitled *Methods and Systems for Providing Contextual Information*, filed on Jun. 28, 2002, and which is incorporated herein by reference.

The present inventions may be implemented through the use of a communications manager. In a related patent application, an exemplary communications and information resource (CIR) manager is described. See U.S. patent application Ser. No. 09/966,703, entitled "Methods and Systems for a Communications and Information Resource Manager," filed Sep. 28, 2001, which is incorporated herein by this reference. The CIR manager may be used to implement the inventions described in this application. Prior to describing the present inventions, some background about the CIR manager is provided.

The CIR Manager

A CIR manager may function as a "super" manager with respect to the communication devices, services, and systems of a user. In particular, the CIR manager may be used to centralize communications activities and information such that the user does not have to (but may) use multiple communications devices. For example, the CIR manager may be used to keep a log of all types of communications related to the user—whatever the device, whatever the service, whatever the network.

An advantage of the CIR manager is the user does not have to check or use each type of device for its own type of messages. Another advantage is the CIR manager may obtain information from resources including third party resources so as to facilitate communications and information gathering activities of the user. With the CIR manager, the user is provided with a centralized, efficient, and user-friendly way to handle communications activities including ways to receive, view, listen to, play, respond to, store, log, monitor, delete, copy, forward, obtain, create, and to take other actions. Moreover, the CIR manager provides the user with personalized management of communications and information resources.

In addition, in managing the communications and information resources of the user, the CIR manager may provide the user with one or more of the following features and advantages:

Recognition of the user and of others as authorized by the user;

Remembrance and implementation of authorized users' preferences;

Aid in finding information and resources;

Information related to the authorized users' activities and communications including call management and detail;

Service set-ups, configurations, changes, deletions, additions, updates, and synchronizations;

Maintenance of user account and preference information, logs, activity logs, schedules, calendars, general directories, personal directories, and the like;

Unified messaging including notice to the user relating to communications and/or other actions; and Contextual information, other information, suggestions, help, updates, reminders, warnings, alerts, and other comments.

The CIR manager may integrate the features described above pursuant to a user's preferences so as to provide efficient, organized, and user-friendly communications and information resource management.

Even though the inventions are described herein by reference to a CIR manager installed in a personal computer (PC), the inventions may be practiced with another manager, and/or other computer system configurations, including hand-held devices, multiprocessor systems, microprocessor based or programmable consumer electronics, mini-computers, mainframe computers, etc.

Information Briefs

The exemplary Information Briefs 12 function may include features that make the CIR manager 10 appear user-friendly. Information Briefs 12 may include information related to the user's identity such as the user's name, and/or other identifying information such as a password or personal identification number (PIN).

Information Briefs 12 also may include information relating to the user that has been selected by the user or otherwise constitutes information customized to the user. For example, customized information may include a quote-of-the-day, a joke, stock quotes, weather, news headlines, etc. With the identity information and the customized information, an exemplary CIR manager 10 "recognizes" a user when he or she activates or uses the CIR manager 10, and "greets" the user with information that has been customized for that user. The recognition of the user and the presentation of customized information advantageously makes the OR manager 10 appear especially user-friendly.

Figure 1B:
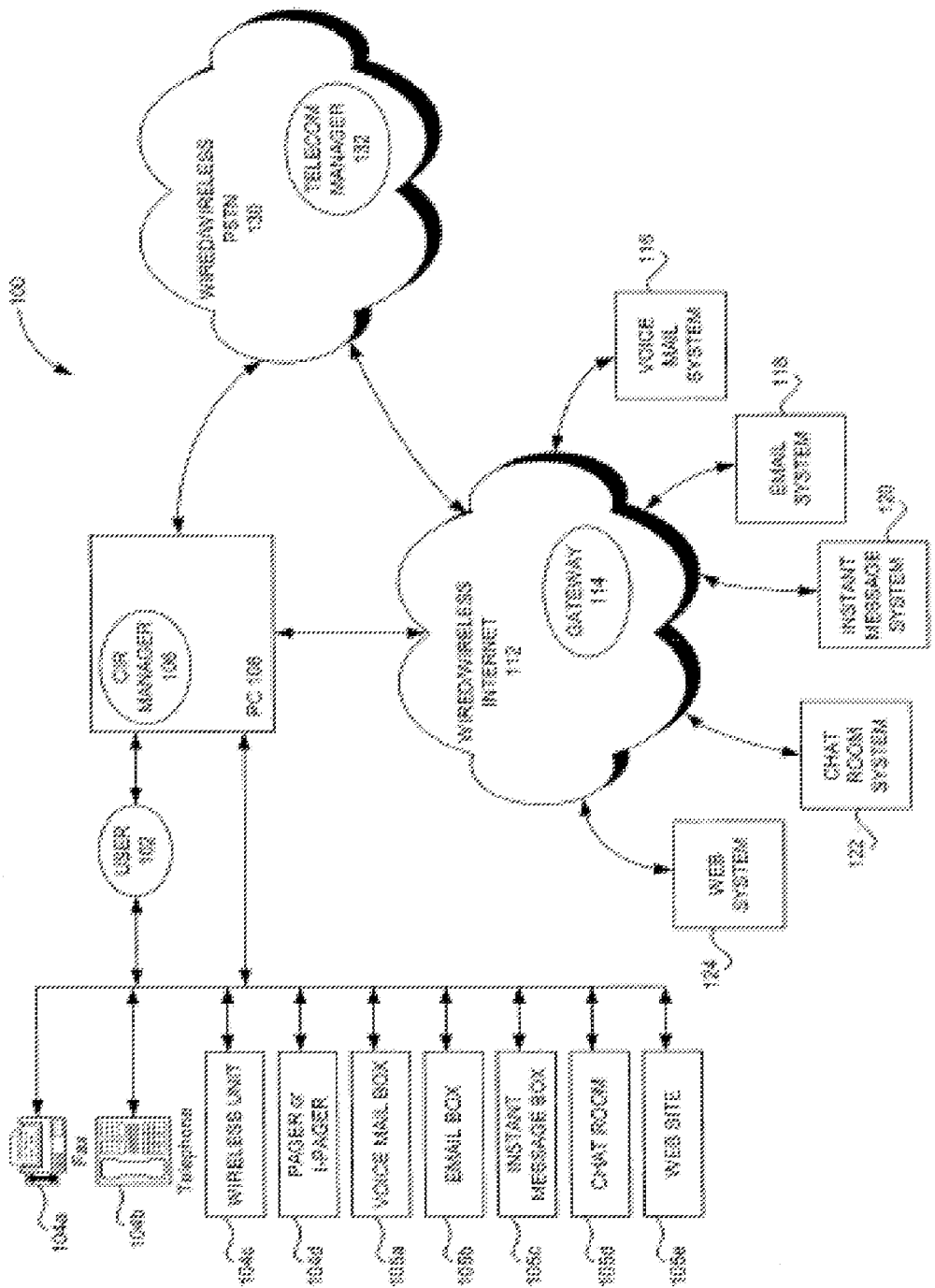
FIG. 1B illustrates an exemplary operating environment of the present inventions.

Exemplary Operating Environment—FIG. 1

FIG. 1 illustrates an exemplary operating environment 100 of the present inventions. A user 102 may use a variety of communication devices including: a facsimile machine (fax) 104a; a telephone 104b; a wireless unit 104c; or a pager or i-pager 104d. The user 102 also may make use of a variety of communication services and be assigned or use functionalities relating to those services. As examples, a user may use: a voice mail system and be assigned a voicemail box 105a; an electronic mail (e-mail or email) system and be assigned an email box (or address) 105b; an instant message system and be assigned an instant message box (or address) 105b; a chat room system and be assigned a chat room (or chat room identity) 105d; or a data network (or web) system and have a web site 105e.

The user's communication devices and services may be managed by a communications manager such as the exemplary CIR manager 106 (described above). As illustrated in FIG. 1, the CIR manager 106 is used with the user's personal computer (PC) 108 and may be directly and/or functionally connected to the user's communication devices and services.

Exemplary functions of a CIR manager 106 are described above. To provide these functions and others, the CIR manager 106 may interact with a variety of systems, networks, and elements that may be directly connected to the CIR manager 106, may be hosted by the same host(s) as the CIR manager 106, may be functionally connected to the CIR manager 106, and/or may be accessible to the CIR manager 106 either directly and/or through other systems, networks, and/or elements.

The CIR manager 106 may communicate through the PC 108 with another computer(s) (not illustrated) connected or otherwise networked with the PC 108. The CIR manager 106 also may communicate with and/or through a data network such as a wired or wireless internet 112 with the following:

Other computer(s) (not illustrated);

An administrative center (not illustrated);

An information resource such as a database (not illustrated);

A gateway 114 serving the CIR manager 106;

A voicemail system 116;

A messaging system such as an email system 118;

An instant messaging (message) system 120;

A chat room system 122;

A web site(s) or web system(s) 124; and

A telecommunications network (wired and/or wireless) such as the public switched telephone network (PSTN) 130.

In addition, the CIR manager 106 may communicate through the PSTN 130 with the following:

A telephone (not illustrated);

A wireless unit (not illustrated);

A pager or an i-pager (not illustrated);

A facsimile device (not illustrated);

A personal digital assistant (not illustrated); and

A telecommunications manager 132.

Of course, besides the connections illustrated in FIG. 1, the CIR manager 10 may have access to other computers through local area networks (LANs), wide area networks (WANs), direct connections and other dial-up networks.

As noted generally above, the CIR manager 106 may have access through the PC 108 to a data network such as a global communications network like the Internet and through the Internet 26 to other units, networks, and systems. Particularly, the CIR manager 106 may communicate with a gateway 114 connected to or operating on the Internet. The gateway 114 may be a service platform, or other device. The gateway 114 may be provided by the service provider of the CIR manager 106, and may serve the CIR manager 106. Communication activities to and from the CIR manager 106 on the PC 108 may be directed to the gateway 114 and/or may pass through the gateway 114 to other systems, networks, and/or elements. In passing through the gateway 114, the communication activities may be facilitated by the gateway 114.

The gateway 114 may facilitate communications activities of the CIR manager 106 so as to function as a router or director of communications and messages. For example, the CIR manager 106 may forward a request for data to the gateway 114. The gateway 114 may determine the data may be obtained from an information resource (not illustrated). The gateway 114 then forwards the request for data or the appropriate message to the information resource. The information resource may respond to the CIR manager 106 or to the gateway 114, which then communicates with the CIR manager 106.

Further, the gateway 28 may facilitate communications activities between the CIR manager 106 and the PSTN 130, and other elements reached through the PSTN 130 such as the telecom manager 132. Generally, the telecom manager 132 provides general functions and features related to communications of a user. Specifically, the telecom manager 132 may be implemented in a computer, on a service platform, in a network node, or other device. The telecom manager 132 may include connections to devices and networks through integrated services digital network (ISDN) lines and signaling system 7 (SS7) data links. The telecom manager 132 may be capable of functions similar to those of a service switching point (SSP) or service node (SN) of an Advanced Intelligent Network (AIN). For example, the telecom manager 132 may have the following capabilities: signaling, call set-up, routing, and access to databases.

Exemplary Operation of the Present Inventions

Profile Information—FIG. 2

To provide a user with contextual information, the present inventions store profile information about the user. Profile information about the user's communicating partners also may be stored. FIG. 2 illustrates in block diagram form the profile information 202 that may be stored about user 102. Similar profile information may be stored about the user's communicating partners. In the exemplary embodiments, the profile information 202 is collected and stored by the CIR manager 106.

Referring to FIG. 2, the profile information 202 for the user 102 may include, among other things, a list of the communication devices and services used by the user. In this example, the user has three communication devices: a telephone 204; a wireless unit 206; and a computer (PC) 208. Each of the entries for the devices may include a description of the respective device. For example, the telephone 204 is described as Brand X. The wireless unit 206 is described as a Motorola unit. The computer 208 is described as a Dell unit. The number of devices and the descriptions of the devices described herein are minimal as they are examples only. Other devices may be included. Generally, the description of a device includes as much information as necessary to be useful in the comparison process described below. For example, the description of a wireless unit may include its brand, trademark, type, and operating specifications, functions, and features.

Also in this example, the user makes use of four communication services. Each service is included in the profile information relating to the user and associated with the appropriate device. Further, each of the services is described in the profile information. As FIG. 2 illustrates, the telephone 204 is associated with local (communication) service 210 from BellSouth and long distance service 212 from AT&T. The wireless unit 206 is associated with service 214 from Cingular. The computer 208 is associated with e-mail service 216 from Microsoft. The number of services and the descriptions of the services described herein are minimal as they are examples only. Other services may be included. As with the communication devices, the description of a communication service in the profile information includes as much information as necessary to be useful in the comparison process described below. For example, the description of a long distance service may identify the service provider and operating specifications, functions and features.

The CIR manager 106 may be provided with data to include in the profile information about the user and about communicating partners. Alternatively, the CIR manager 106 may monitor the user's communications, and be provided with or obtain data to be included in the profile information.

For example, assume the user acquires a pager and uses it with the CIR manager 106. The user supplies the CIR manager 106 with certain data relating to the pager so the pager may operate with the CIR manager 106. The CIR manager 106 also may be supplied with data relating to the pager by the manufacturer or other representative of the manufacturer. Further, the CIR manager 106 may be supplied with data relating to the pager by the service provider providing the paging service. Nevertheless, the CIR manager 106 may require or be able to handle additional data regarding the pager. In some embodiments, the CIR manager 106 may obtain the data about the pager by contacting an information resource (not illustrated) through the gateway 114 over the Internet 112 or through the telecom manager 132 over the PSTN 130. As an example, such an information resource may be a web site of the manufacturer of the pager or administrative center of the service provider providing the user with the paging service.

Figure 3:
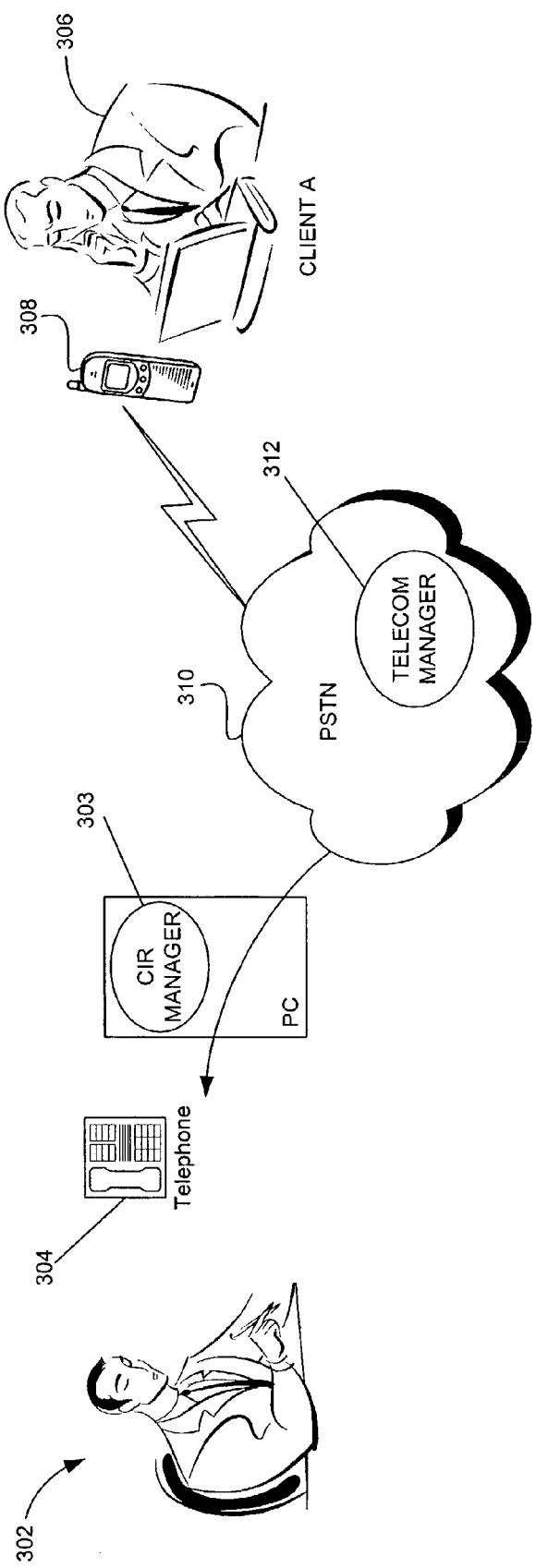
FIG. 3 illustrates an exemplary environment in which the present inventions may provide contextual information.

Example of Presentation of Contextual Information—FIG. 3

Referring to FIG. 3, an exemplary method of providing a user with contextual information is described. In this example, a user 302 makes use of a CIR manager 303 in connection with the user's communications. Assume the user 302 uses a telephone 304 to receive a call from Client A 306. In this example, the user 302 does not have a wireless unit. But Client A 306 uses a wireless unit 308 to make the call to the user. The call is routed from the wireless unit 308 through the appropriate networks such as the public switched telephone network (PSTN) 310, and may be routed through the telecommunications (telecom) manager 213 in the PSTN 310 to the telephone 304 of the user 302. The CIR manager 303 may be part of the routing of the call, or, as noted below, the CIR manager 303 may be provided with data about the call.

The data about the call that the CIR manager 303 may receive may include:

Type of call or communication, e.g., wireline call, wireless call, facsimile (fax) communication, page, i-page, e-mail message, chat room message, instant message, or other communication;

Type of communication device originating the call or communication, e.g., telephone, wireless unit, fax machine, pager, i-pager, personal computer, or other device; and Information about the communication device, e.g., brand name, features, functions, specifications, features, or other information.

In addition, the CIR manager 303 may receive other data relating to the call or communication such as the originating telephone, wireless, or facsimile number, originator (such as caller) identification information, originating electronic mail address or identification, or other data.

Referring to the example presented in connection with FIG. 3, assume the CIR manager 303 is presented with the following data about the call from Client A 306:

The call is from a wireless unit;

The type of the wireless unit is a Brand X unit;

The time sensitivity of the call; and

The wireless unit operates per the IS-41 protocols.

The CIR manager 303 may receive the data about the call from the telecom manager 312 or otherwise. In the case of a communication received from or in connection with a data network, the CIR manager 303 may receive the data about the communication from the gateway in the data network. The receipt of the data by the CIR manager 303 may be the result of the CIR manager's efforts to obtain data about the call or communication. For example, the CIR manager may contact the telecom manager 312 or other entity for the data about the call. As another example, the CIR manager may contact the gateway in the data network for data about a communication. As another example, the CIR manager 303 may use a network address associated with the call or the communication to take action to receive the data. As yet another example, the CIR manager 303 may be provided with an address so as to take action to receive the data.

The CIR manager compares the data about the communication with profile information stored about the user. For example, the CIR manager 303 may compare the type of communication device/service originating the call against the type of device(s)/service included in the profile information of the user. Based on the comparison, the CIR manager 303 may present the user with contextual information that includes specifics about the originating communicating device or service. By way of example, the comparison may find that the caller uses the same type of device/service as the user. The user then may be presented with contextual information such as the following: "The caller is Dale Malik. Same as you, he uses an Acme brand wireless unit and his service provider is Beverly Communication Services." The contextual information also may provide the user with an option(s) of responding to or returning the call or communication by communication paths that are selected based on the data about the call.

The comparison process may look for a discrepancy between the data about the communication and the profile information stored about the user. A discrepancy also may be characterized as a difference or gap in information. As noted, in the example presented in connection with FIG. 3, the user 302 does not have a wireless unit. The CIR manager 303 reaches this conclusion based on its comparison of the data about the call and the profile information about the user 302 and finding the discrepancy of the user not having a wireless unit.

Having determined the user 302 does not have a wireless unit, the CIR manager 303 may take action on this result of the comparison between the profile information of the user and the data about the call. As noted, an action the CIR manager 303 may take is to present contextual information relating to the call. The CIR manager 303 may have such contextual information or may have to obtain contextual information relating to the call. Contextual information may be almost any information relating to the call or communication and communication device or communication service associated with the call or communication. Contextual information may include advertising, marketing, technical, sales, service, safety, or quality information, etc. In addition, contextual information may relate to communication paths and possible alternative communication paths between the originating communicator and the user.

Referring to the example presented in connection with FIG. 3, the CIR manager 303 determines the user 302 does not have a wireless unit based on a comparison of the data about the communication and the profile information relating to the user. The CIR manager 303 may have or may have to act to obtain information about a wireless unit(s) and wireless service and may present the wireless unit and service information as contextual information to the user 302. For example, the CIR manager 303 may contact the telecom manager 312 and obtain information about wireless units that may be appropriate for the user 302.

The CIR manager 303 and the telecom manager 312 may be associated with a particular service provider that also provides services and/or provides wireless units. Thus, the user 302 may be provided with contextual information including information on wireless units and wireless service as available from the particular service provider. Advantageously, the contextual information provided to the user 302 on wireless units and wireless service may laud the products and services of the particular service provider already providing the user with the CIR manager 303 and related service. Thus, the particular service provider has an opportunity to advertise market, and hopefully, to provide additional products and services to the user. The advertising opportunity may be unique to the particular service provider. For example, the information from the particular service provider may be the only contextual information provided to the user in connection with the call from Client A.

Advantageously, in an embodiment, the CIR manager 10 may function to add, change, delete, or update information related to a user including identification information. For example, a user may have his or her account for the CIR manager 10 set up prior to obtaining a wireless unit such as a mobile phone. So, the identification information relating to the user at set-up does not include a mobile phone number. Once the user acquires a mobile phone, information relating to the user's mobile phone may be stored at or made accessible to the CIR manager 10. For example, the CIR manager 10 may have access to a database, a listserv, or other resource with information on new wireless users. The CIR manager 10 may note the presence of the user's name or other identifying information from the resource, and may obtain the pertinent data related to the user's use of wireless services. The CIR manager 10 then may update its records on the user.

As another example, some time after set-up, the service provider of the CIR manager 10 may begin to provide wireless service to the user. Thus, the CIR manager 10 may have access to the service provider's records so as to update the identification information related to the user with the user's new mobile phone number. As yet another example, the user may receive an e-mail from a friend. But the CIR manager 10 may not include information relating to the friend in the user's identification information. The CIR manager 10 may use the information from the e-mail to create an entry or record of identification information relating to the friend for the user.

Another advantage of the present inventions is that the contextual information is presented to the user at a time when the user's interest in the subject matter may be heightened (i.e., at the time of receipt of a call made from a wireless unit). Thus, the contextual information may serve as very effective advertising.

As an alternative to the particular service provider, the CIR manager 303 may request and receive information to be presented to the user as contextual information from another source. For example, the CIR manager 303 may contact a gateway in a data network for relevant information. The gateway may route the request to or make its own request of an information source. The information source may be a website, database, administrative center, etc. including information on wireless units and service. Of course, the CIR manager 303 may launch multiple queries or requests to and/or through the PSTN 310 or data networks (such as the Internet) for information to be included and presented as contextual information to the user.

As noted in the background, advertising or other information that is presented to a user when the user's interest is heightened is generally more effective or more readily remembered than advertising or information presented at other times. A user's interest in a communication device or service may be heightened at times when the user is involved in communications. Advantageously, the present inventions allow the contextual information described above to be presented to the user at various times in connection with a communication. For example, as described in further detail in the paragraphs below, the user may be presented with contextual information before, during, or after the communication.

Moreover, the contextual information may be presented on or through a communication device the user is using for the communication, but the contextual information may be presented on or through another communication device.

Contextual information may be provided to the user when the user is initially presented with the communication or with the data or information about the communication. For example, the user may receive notice of Client A's call from the CIR manager. The CIR manager may provide such notice to the user as a message appearing on the user's computer. In addition to the message about the call, the CIR manager may present the contextual information so it appears on the user's PC. Optionally, the CIR manager may present a short message (such as a balloon of information) that contextual information is available. If the user exercises the option (by double-clicking on the balloon or otherwise), then the contextual information may be presented.

As another example, the user may receive a call on his or her wireless unit. Prior to the call being connected to the wireless unit, the CIR manager may cause the contextual information to be presented to the user in the form of a voice message. Alternatively, the CIR manager may signal the user when the call is connected to the wireless unit with the signal indicating that contextual information is available. The user may choose to listen to or otherwise review the contextual information prior to taking the call.

Similarly, the contextual information may be provided to the user when the user is engaged in the communication. While the user is communicating with Client A on the telephone, for example, the CIR manager may present contextual information on the user's PC. As another example, if the user receives a fax, the CIR manager may cause contextual information to be included in or with the fax.

Further, the contextual information may be provided to the user after the user finishes with the communication. For example, the user may use a telephone to speak with a friend. Before, during, or after the communication, the user may hear a signal (such as three beeps or otherwise) to indicate contextual information is available. When the user finishes the conversation, the user may hook flash the telephone or otherwise take action to access the contextual information. In this example, the contextual information may be provided by the CIR manager as a voice message.

In some embodiments, the user may cause the contextual information to be saved for review at a later time. For example, the user may hear a signal when he or she picks up a wireless call with the signal indicating the availability of contextual information. The user may desire to review the contextual information at a later time. The user may save the contextual information for later review by providing a responsive signal. Further, the user may provide an indication regarding the format in which the contextual information is to be saved. Referring to the example, in response to hearing the signal indicating the availability of contextual information, the user may provide a responsive signal. The user then may hear a list of options regarding the presentation of the contextual information including:

"to play contextual information now, press '1'";
"to play contextual information at the end of this call, press '2'";
"to save contextual information to your PC, press '3'";
"to e-mail the contextual information, press '4'";
"to fax me the contextual information, press '5'"

Advantageously, the user is provided with notice of the availability of the contextual information and may determine a format for the review of the contextual information at another time.

Advantageously, the functions of the CIR manager 10 may work together through the exchange of information or otherwise. For example, the Information Briefs function includes identity information and customized information relating to the user. When a graphic user interface (GUI) of the CIR manager is presented to the user, the GUI, whatever the function, may include the identity information and the customized information. Specifically, assume the user is presented with a GUI including a summary of communication activities through use of the Message Logs function. As part of the GUI displaying the summary, the user may be presented with the identity information such as ("Hello Dale Malik!") and/or the customized information ("It's raining in Dunwoody today.").

Similarly, the identity information from the Information Briefs function may interact with the other functions of the CIR manager. For example, the identity information may be used by the Account Information function in presenting the user with a statement for services, in setting-up the user's configurations and preferences for the CIR manager, in providing service help and information, and also in assisting at the subscription center.

Another example of the interactivity or interoperability of the functions of the CIR manager relates to the use of the information that may be found in the Directories function. As noted, the Directories function may include a personal address book of the user for storing information on friends and family. An entry for a friend in the personal address book may include the friend's name, nickname, address, telephone number, wireless number, pager number, fax number, e-mail address, birth date, mode of communications preference, etc. The information relating to the friend in the personal address book included in the Directories function may be obtained by or exchanged with other functions of the CIR manager.

For example, assume the user desires to communicate with a friend, and in doing so, the user selects the Message Center function. The user may provide the nickname of the friend, and information related to the friend may be obtained by the Message Center function from the personal address book of the Directories function. The information related to the friend may indicate the mode of communications preferred by the friend. Based on this preference, the Message Center function may set up a communication template for the preferred mode of communication for use by the user.

More particularly, assume the friend prefers to communicate by e-mail. Thus, in response to provision of the friend's nickname to the Message Center function, information related to the friend is obtained from the personal address book of the Directories function. Based on the information, the Message Center function notes the preferred mode of communication being e-mail. So, the Message Center function sets up an e-mail template in a GUI for use by the user. Preferably, the Message Center function also populates the appropriate fields of the e-mail template with information relating to the friend. Thus, the e-mail template appears to the user with the friend's full name, e-mail address, date, time, etc. The user simply provides subject matter and text of the message to the friend, and sends the e-mail message from the Message Center function.

Flow Chart of an Exemplary Presentation of Contextual Information—FIG. 5

Figure 4:
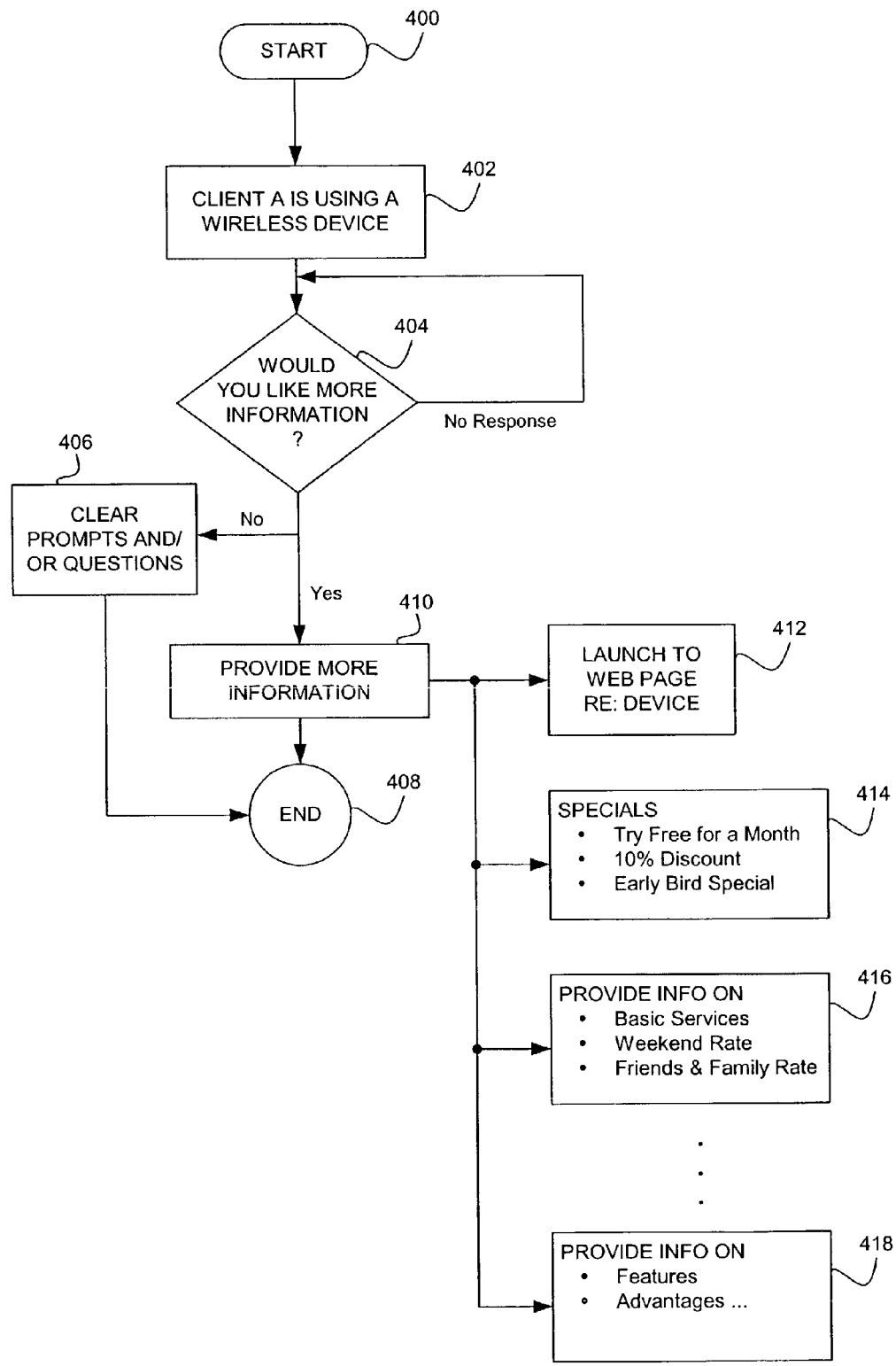
FIG. 4 is an exemplary flow diagram illustrating exemplary actions of the present inventions.

FIG. 5 is a flow chart illustrating an exemplary process for the presentation of contextual information. For this exemplary process, assume a Client A is using a wireless device to call the user. The user is notified of the call by an announcement or by a message appearing on his or her computer screen. In addition to the basic information about the call from Client A, in action 402, the process presents the user with information that Client A is using a wireless device. In action 404, the user is asked whether he or she would like "more" information, i.e., contextual information. If there is no response from the user, then the process may continue to query the user for a response as illustrated in FIG. 4, or the process may time out. Alternatively, the default for failing to respond to the query of action 404 may be to present contextual information.

In response to the query of action 404, the user may decline the offer of contextual information. If so, then in action 406 the screen may be cleared of information other than that related to the notification regarding the call. For example, the prompts and/or questions referenced above may be cleared. The process then ends in action 408.

If the user accepts the offer of more information (contextual information), then in action 408 more information is provided. Examples of contextual information that may be provided are set out in adjunct actions 412-418. For example, in action 412 the CIR manager may launch to a web page or side including information about the wireless device.

As another example, the CIR manager periodically may receive special advertising, marketing, technical, or other information. The information may be received from or through the telecom manager in the PSTN or from or through the gateway in a data network. Specifically, a service provider periodically may send information to the CIR manager. This information may be stored by the CIR manager until an appropriate time or opportunity arises when the CIR manager may present the information as contextual information to the user. As action 414 illustrates, such contextual information may include "specials" such as free offers, discounts, early bird specials, etc. Advantageously, by this process, the user may be kept apprised of a service provider's latest discounts, sales, price breaks, etc.

As yet another example, the CIR manager may be configured to include certain information about communication devices and services. Thus, in action 416 the CIR manager may obtain the information from its own resources and present this information as contextual information.

Another example of the provision of contextual information is based on the CIR manager's actions in obtaining the information. For example, the CIR manager may query an appropriate information source through the telecom manager and the PSTN or through the gateway and a data network such as the Internet. The CIR manager then may present the information the CIR manager obtained as contextual information.

Once the contextual information is presented, the exemplary process ends in action 408. But the interaction between the user and the contextual information need not end with such presentation. In exemplary embodiments, the user may be able to obtain additional or different contextual information through a process similar to that described above. More particularly, the CIR manager may offer the user additional contextual information, and based on a positive response, the CIR manager may present the additional contextual information. For example, assume the CIR manager presents the user with information on wireless units. The user may request additional contextual information relating to a specific type of wireless unit. The CIR manager may present additional information on the specific type of wireless unit such as by connecting the user to a web site having such information.

The exemplary embodiments of the inventions described herein were chosen and described in order to explain the principles of the inventions and their practical applications so as to enable others skilled in the art to utilize the inventions including various embodiments and various modifications as are suited to the particular uses contemplated. The examples provided herein in the written description or in the drawings are not intended as limitations of the inventions. Other embodiments will suggest themselves to those skilled in the art. Therefore, the scope of the inventions is to be limited only by the claims below.

We claim:

1. A system for providing a recipient with contextual information relating to a call, comprising:
   a processor;
   memory; and
   a customer and information resource manager stored in the memory, the customer and information resource manager centralizing communications activities and information so that when executed the customer and information resource manager causes the processor to perform operations, the operations comprising:
   store profile information describing the recipient, the profile information comprising a list of communications devices used by the recipient, communications services used by the recipient, a service provider of each communications service, communicating partners of the recipient, and service providers used by the recipient;
   display an information brief that presents customized information that greets the recipient and identifies others who are authorized to access the profile information;
   access a database storing information on new wireless users and, when a calling name is present in the database, obtain a mobile phone number from the database that is associated with the calling name;
   display a message center that provides a communication template for a preferred mode of communication;
   display a message log that provides summaries of new and sent communications and an activity log that tracks communications activity of the recipient;
   display a calendar and scheduler allowing the recipient to establish notifications regarding an electronic calendar;
   receive the call at a recipient's communications device;
   receive data describing an originating device that originated the call;
   compare the data describing the originating device to the profile information of the recipient;
   determine from the comparison that the originating device is a wireless unit and that the recipient of the call lacks the wireless unit;
   retrieve advertising information as the contextual information;
   retrieve a voice message describing wireless devices;
   present an audible signal during the call that indicates the advertising information is available;
   receive a response to the audible signal from the recipient to save the advertising information for later review;
   present a list of options for saving the advertising information for the later review;
   receive another response to play the advertising information at the end of the call;
   receive a hook-flash from the recipient to obtain the advertising information; and
   after the hook-flash, present the voice message describing wireless services available to the recipient.

2. The system of claim 1, wherein the code further causes the processor to determine an alternative communications path between the recipient and an originating party.

3. The system according to claim 1, wherein the customer and information resource manager further causes the processor to describe an alternative communication path between the recipient and an originating party.

4. The system according to claim 1, wherein the customer and information resource manager further causes the processor to present a list of options to format the contextual information.

5. The system according to claim 1, wherein the customer and information resource manager further causes the processor to query for the contextual information.

6. The system according to claim 1, wherein the customer and information resource manager further causes the processor to receive a manufacturer of the originating device and an operational protocol of the originating device.

7. The system according to claim 1, wherein the customer and information resource manager further causes the processor to receive a type of the originating device.

8. The system according to claim 1, wherein the customer and information resource manager further causes the processor to query a telecom manager in a telecommunications network.

9. The system according to claim 1, wherein the customer and information resource manager further causes the processor to query a gateway in a data network.

10. The system according to claim 1, wherein the customer and information resource manager further causes the processor to save the contextual information for later review.

\* \* \* \* \*